US007862655B2

(12) United States Patent
Brothers et al.

(10) Patent No.: US 7,862,655 B2
(45) Date of Patent: Jan. 4, 2011

(54) SUBTERRANEAN CEMENTING METHODS AND COMPOSITIONS COMPRISING OIL SUSPENSIONS OF WATER SOLUBLE POLYMERS

(75) Inventors: Lance Brothers, Chickasha, OK (US); Bobby J. King, Duncan, OK (US); Gary P. Funkhouser, Duncan, OK (US)

(73) Assignee: Halliburton Energy Services Inc., Duncan, OK (US)

( * ) Notice: Subject to any disclaimer, the term of this patent is extended or adjusted under 35 U.S.C. 154(b) by 790 days.

(21) Appl. No.: 11/763,227

(22) Filed: Jun. 14, 2007

(65) Prior Publication Data

US 2008/0308011 A1 Dec. 18, 2008

(51) Int. Cl.
*C04B 16/00* (2006.01)
*C04B 16/02* (2006.01)

(52) U.S. Cl. ............... 106/724; 106/726; 106/727; 106/730

(58) Field of Classification Search .......... 106/724, 106/726, 727, 730
See application file for complete search history.

(56) References Cited

U.S. PATENT DOCUMENTS

| | | | |
|---|---|---|---|
| 2,805,719 A | 9/1955 | Anderson | 166/29 |
| 3,757,864 A | 9/1973 | Crawford et al. | 166/308 |
| 3,798,162 A | 3/1974 | Dickert, Jr. et al. | 252/32.5 |
| 4,007,128 A | 2/1977 | Poklacki | 252/316 |
| 4,144,179 A | 3/1979 | Chatterji | 252/8.55 R |
| 4,200,539 A | 4/1980 | Burnham et al. | 252/8.55 R |
| 4,378,049 A | 3/1983 | Hsu et al. | 166/295 |
| 4,472,200 A | 9/1984 | Crump et al. | |
| 4,515,635 A | 5/1985 | Rao et al. | 106/90 |
| 4,555,269 A | 11/1985 | Rao et al. | 106/90 |
| 4,664,843 A | 5/1987 | Burba, III et al. | |
| 4,687,516 A | 8/1987 | Burkhalter et al. | 106/90 |
| 4,742,094 A | 5/1988 | Brothers et al. | 523/130 |
| 4,743,384 A | 5/1988 | Lu et al. | 252/8.514 |
| 4,791,989 A | 12/1988 | Brothers et al. | 166/293 |
| 4,818,288 A | 4/1989 | Aignesberger et al. | 106/90 |
| 4,941,536 A | 7/1990 | Brothers et al. | 166/293 |
| 5,049,288 A | 9/1991 | Brothers et al. | 252/8.551 |
| 5,086,850 A | 2/1992 | Harris et al. | 175/61 |
| 5,121,795 A | 6/1992 | Ewert et al. | 166/292 |
| 5,123,487 A | 6/1992 | Harris et al. | 166/277 |
| 5,125,455 A | 6/1992 | Harris et al. | 166/292 |
| 5,127,473 A | 7/1992 | Harris et al. | 166/277 |
| 5,151,131 A | 9/1992 | Burkhalter et al. | |
| 5,202,035 A | 4/1993 | Huddleston | 252/8.551 |
| 5,238,064 A | 8/1993 | Dahl et al. | 166/293 |
| 5,252,554 A | 10/1993 | Mueller et al. | 507/138 |
| 5,271,464 A | 12/1993 | McCabe | 166/295 |
| 5,355,955 A | 10/1994 | Rodrigues et al. | 166/293 |
| 5,403,822 A | 4/1995 | Mueller et al. | 507/138 |
| 5,472,051 A | 12/1995 | Brothers | 166/293 |
| 5,647,900 A | 7/1997 | Smith et al. | |
| 5,649,596 A | 7/1997 | Jones et al. | 166/300 |
| 6,060,434 A | 5/2000 | Sweatman et al. | 507/216 |
| 6,167,967 B1 | 1/2001 | Sweatman | 166/281 |
| 6,169,058 B1 | 1/2001 | Le et al. | |
| 6,210,476 B1 | 4/2001 | Chatterji et al. | |
| 6,235,809 B1 | 5/2001 | Arias et al. | 523/130 |
| 6,268,406 B1 | 7/2001 | Chatterji et al. | 523/130 |
| 6,315,042 B1 | 11/2001 | Griffith et al. | 166/291 |
| 6,511,944 B2 | 1/2003 | Taylor et al. | |
| 6,524,384 B2 | 2/2003 | Griffith et al. | 106/705 |
| 6,561,273 B2 | 5/2003 | Brothers et al. | 166/294 |
| 6,590,050 B1 | 7/2003 | Bair et al. | 526/240 |
| 6,666,268 B2 | 12/2003 | Griffith et al. | 166/292 |
| 6,668,929 B2 | 12/2003 | Griffith et al. | 166/292 |
| 6,716,282 B2 | 4/2004 | Griffith et al. | 106/705 |
| 6,722,433 B2 | 4/2004 | Brothers et al. | 166/288 |
| 6,767,867 B2 | 7/2004 | Chatterji et al. | 507/216 |

(Continued)

FOREIGN PATENT DOCUMENTS

DE 4418156 A1 11/1995

(Continued)

OTHER PUBLICATIONS

Office Action for U.S. Appl. No. 11/763,218, dated Apr. 27, 2009.

(Continued)

*Primary Examiner*—Paul Marcantoni
(74) *Attorney, Agent, or Firm*—Craig W. Roddy; Baker Botts LLP

(57) ABSTRACT

Of the many methods and compositions provided herein, one method comprises providing a cement composition, wherein the cement composition comprises a cementitious component and an additive comprising a polymer, a phosphorus component, a polyvalent metal ion, an oil-based liquid, and a surfactant; introducing the cement composition into at least a portion of the subterranean formation; and allowing the cement composition to at least partially set therein. Another method provided herein comprises providing a cement composition that comprises a cementitious component and an additive comprising a polymer, a phosphorus component, a polyvalent metal ion, an oil-based liquid, and a surfactant; introducing the cement composition into a void located in a pipe string; and allowing the cement composition to at least partially set therein. A cement composition provided herein comprises a cementitious component; and an additive comprising a polymer; a phosphorus component; a polyvalent metal ion; and an oil-based liquid; and a surfactant.

18 Claims, No Drawings

U.S. PATENT DOCUMENTS

| | | | |
|---|---|---|---|
| 6,770,601 B1 | 8/2004 | Brookey | 507/102 |
| 6,887,832 B2 | 5/2005 | Kirsner et al. | 507/103 |
| 6,887,833 B2 | 5/2005 | Brothers et al. | 507/209 |
| 6,908,508 B2 | 6/2005 | Brothers | 106/794 |
| 6,911,494 B2 | 6/2005 | Yamashita et al. | |
| 6,983,800 B2 | 1/2006 | Chatterji et al. | 166/293 |
| 7,040,404 B2 | 5/2006 | Brothers et al. | 166/293 |
| 7,073,585 B2 | 7/2006 | Morgan et al. | 166/294 |
| 7,087,556 B2 | 8/2006 | Chen et al. | 507/216 |
| 7,111,684 B2 | 9/2006 | Brothers et al. | 166/294 |
| 7,147,705 B2 | 12/2006 | Chatterji et al. | 106/696 |
| 7,172,022 B2 | 2/2007 | Reddy et al. | 166/293 |
| 7,204,307 B2 | 4/2007 | Roddy et al. | 166/250.14 |
| 7,204,310 B1 | 4/2007 | Roddy et al. | 166/293 |
| 7,213,647 B2 | 5/2007 | Brothers et al. | 166/288 |
| 2003/0006037 A1 | 1/2003 | Brothers et al. | |
| 2003/0144153 A1 | 7/2003 | Kirsner et al. | 507/100 |
| 2004/0214728 A1 | 10/2004 | Taylor et al. | 507/235 |
| 2005/0032652 A1 | 2/2005 | Kirsner et al. | 507/100 |
| 2005/0034864 A1 | 2/2005 | Caveny et al. | 166/293 |
| 2005/0121194 A1 | 6/2005 | Morgan et al. | 166/293 |
| 2005/0124503 A1 | 6/2005 | Morgan et al. | 507/226 |
| 2006/0131019 A1 | 6/2006 | Santra et al. | 166/292 |
| 2006/0211580 A1 | 9/2006 | Wang et al. | |
| 2007/0022917 A1 | 2/2007 | Chatterji et al. | 106/807 |
| 2007/0056728 A1 | 3/2007 | Roddy et al. | 166/250.14 |
| 2007/0078060 A1 | 4/2007 | Kirsner et al. | 507/100 |
| 2007/0078061 A1 | 4/2007 | Kirsner et al. | 507/103 |
| 2007/0078062 A1 | 4/2007 | Kirsner et al. | 507/103 |
| 2007/0082822 A1 | 4/2007 | Kirsner et al. | 507/100 |
| 2007/0082824 A1 | 4/2007 | Bell et al. | |
| 2007/0102157 A1 | 5/2007 | Roddy et al. | 166/291 |
| 2007/0111900 A1 | 5/2007 | Reddy et al. | |
| 2008/0308275 A1 | 12/2008 | Brothers | |
| 2009/0036637 A1 | 2/2009 | Otter et al. | |

FOREIGN PATENT DOCUMENTS

| | | | |
|---|---|---|---|
| EP | 1559867 A1 | 8/2005 | |
| WO | WO0242392 A | 5/2002 | |
| WO | WO2005100739 A1 | 10/2005 | |

OTHER PUBLICATIONS

Office Action for U.S. Appl. No. 11/763,215, dated Sep. 8, 2009.
Office Action mailed Sep. 12, 2008, for U.S. Appl. No. 11/763,218.
International Search Report and Written Opinion for PCT/GB2008/001855, dated Dec. 2, 2008.
Crofts, et al., "Unsymmetrical Diallcylphosphinic Acids," *J Chem. Soc.* 1958, 2995-2997.
Boyd, et al., "Synthesis of γ-keto-substituted phosphinic acids from bis(trimethylsilyl)phosphonite and α,β-unsaturated ketones," *Tetrahedron Lett.*, 1992, 33, 813-816.
Boyd, E.A.; Regan, A.C.; James, K., "Synthesis of Alkyl Phosphinic Acids from Silyl Phosphonites and Alkyl Halides," *Tetrahedron Lett.*, 1994, 35, 4223-4226.
Halliburton, "Top Technology Solutions 2006, High Performacne Drilling Fluid Systems," 1-2, 2006.
Halliburton, "Baroid Fluid Services, ACCOLADE® High-Performance Synthetic-Based Fluids from Baroid," 1-2, 2006.
Halliburton, "Baroid Fluid Services, ACCOLADE® Drilling Fluid Exceeds New GOM Environmental Standards And Boosts Performance," 1-2, 2005.
Halliburton, "CFR-2 Cement Friction Reducer," 1-2, 1999.
Halliburton, "CFR-3™ Cement Friction Reducer," 1, 2005.
Halliburton, "Cementing, FWCA™," 1, 2006.
Halliburton, "Cementing, Halad®-344 Fluid-Loss Additive," 1, 2006.
Halliburton, "SSA-1™ Cement Additive," 1, 2006.
Halliburton, "SCR-100™ Cement Retarder," 1, 2006.
Halliburton, "Cementing, Pozmix® A Cement Additive," 1, 2007.
Halliburton, Solution Profile, BSS03-049, "World's First Use of XP-07™ Synthetic-Based Drill-In Fluid Followed by Brine Gravel Pack Proves Successful, Saves £1 Milliion for Operator," 1-3, 2003.
PETROFREE™, "The Biodegradable Solution for High-Performance Drilling," 1-7.

SUBTERRANEAN CEMENTING METHODS AND COMPOSITIONS COMPRISING OIL SUSPENSIONS OF WATER SOLUBLE POLYMERS

BACKGROUND

The present invention relates generally to cement compositions useful in subterranean operations, and more specifically, to additives and cementitious components comprising oil suspensions of water soluble polymers, and methods of use in subterranean cementing operations.

Hydraulic cement compositions are commonly utilized in subterranean well completion and remedial operations. For example, hydraulic cement compositions may be used in primary cementing operations whereby strings of pipe such as casings and liners are cemented in well bores. In performing primary cementing, a hydraulic cement composition may be pumped into the annular space between the walls of a well bore and the exterior surfaces of a pipe string disposed therein. The cement composition is permitted to set in the annular space thereby forming an annular sheath of hardened substantially impermeable cement therein which supports and positions the pipe string in the well bore and bonds the exterior surfaces of the pipe string to the walls of the well bore. Hydraulic cement compositions may also be utilized in remedial cementing operations such as plugging highly permeable zones or fractures in well bores, plugging cracks or holes in pipe strings and the like.

Additives are used in cement compositions, among other purposes, to reduce fluid loss from the cement compositions to permeable formations or zones into or through which the cement compositions are pumped. In certain circumstances, it may be desirable to place a polymer within the cement composition, for example, to reduce loss of fluid from the cement composition and/or improve solids suspension therein.

The creation of cement compositions containing additives has typically involved combining a dry blend of such additives into the cement compositions with the aid of a blending facilities to reach sufficient levels of additive concentration within the mixture. In some cases, such as off-shore cementing operations, the cement operation may not have sufficient blending facility at hand to dry-blend the additive into a sufficiently-homogenous cement composition. These concerns usually necessitate the use of a liquid additive where a neat cement and/or certain additives are combined in an aqueous solution. With high molecular weight polymers, the active solution may be restricted to lower concentrations, as higher concentrations of the polymer may cause the solution to have an undesirably high viscosity prior to mixing with the remainder of the cement composition, making the solution with the polymer more difficult to mix into the cement composition. Moreover, lower concentrations of the polymer may not be as effective in reducing fluid loss of the cement composition, and providing other benefits in the operation. This may result in the undesirable and inefficient use of liquid additives, as excess amounts of solutions comprising the water-soluble polymer may be required to obtain the desired formulation.

SUMMARY

The present invention relates generally to cement compositions useful in subterranean operations, and more specifically, to additives and cementitious components comprising oil suspensions of water soluble polymers, and methods of use in subterranean cementing operations.

A cement composition comprising: a cementitious component and an additive comprising a polymer; a phosphorus component; a polyvalent metal ion; an oil-based liquid; and a surfactant.

An additive for cement comprising: a polymer; a phosphorus component; a polyvalent metal ion; an oil-based liquid; and a surfactant.

A cement composition comprising: a Class H cement and an additive comprising: a water-soluble polymer wherein said water-soluble polymer is present in a range of from about 30% to about 50% by weight of the additive; an oil-based liquid; a phosphate ester wherein said phosphate ester is present in a range of from about 0.05% to about 0.2% by weight of the oil-based liquid; an iron III sulfate wherein said iron III sulfate is present in the range of from about 0.012% to 0.07% by weight of the oil-based liquid; and a surfactant including an oleic acid wherein said surfactant is present in the range of about 0.01% to about 2% by weight of the oil-based liquid.

The features and advantages of the present invention will be readily apparent to those skilled in the art. While numerous changes may be made by those skilled in the art, such changes are within the spirit of the invention.

DESCRIPTION OF PREFERRED EMBODIMENTS

The present invention relates generally to cement compositions useful in subterranean operations, and more specifically, to additives and cement compositions comprising oil suspensions of water soluble polymers, and methods of use in subterranean cementing operations.

Among the many benefits of the present invention, the methods and compositions of the present invention may provide, among other things, cement compositions that exhibit enhanced viscosity, reduced settling, and reduced fluid loss. Additional advantages of the present invention may be apparent to those skilled in the art, with the benefit of this disclosure.

The additives of the present invention generally comprise a polymer, a phosphorus component, a polyvalent metal ion, an oil-based liquid, and a surfactant. The cement compositions of the present invention also generally comprise an aqueous fluid and a cementitious component in addition to each of the elements of the additive.

The polymer used in the present invention may comprise any polymer (or combination thereof) known in the art that is soluble in water (or another aqueous fluid) or water swellable. Such polymers may function, inter alia, as fluid loss control agents, viscosifiers, and the like. In certain embodiments, the polymers may include one or more polymers selected from the group consisting of polysaccharides, polyacrylates, polyacrylamides (such as hydrolyzed copolymers of acrylamide and 2-acrylamido-2-methylpropanesulfonic acid, and copolymers of N,N-dimethylacrylamide and 2-acrylamido-2-methylpropanesulfonic acid), cellulose derivatives (such as hydroxyethylcellulose, carboxymethylcellulose and carboxymethylhydroxyethylcellulose), galactomannan gums (e.g., guar, hydroxyethyl guar, hydroxypropyl guar, carboxymethyl guar, carboxymethylhydroxyethyl guar, carboxymethylhydroxypropyl guar ("CMHPG"), and other derivatives of guar gum), biopolymers (e.g., xanthan, scleroglucan, diutan), derivatives thereof, and combinations thereof. The term "derivative" is defined herein to include any polymer that is made from one of the listed polymers, for example, by replacing one atom in one of the listed polymers with another atom or group of atoms, ionizing one of the listed polymers, or creating a salt of one of the listed polymers. In certain embodiments, the polymers may comprise one or more polymers that have at least two molecules that are capable of being crosslinked by a crosslinking reaction in the presence of a crosslinking agent, and/or polymers that have at least two molecules that are so crosslinked (i.e., a crosslinked polymer).

Commercially available products that comprise polymers that may be suitable for use in the present invention include, but are not limited to HALAD-344™ (a copolymer of 2-acrylamido-2-methylpropanesulfonic acid & N,N-dimethylacrylamide, available from Halliburton Energy Services, Duncan, Okla.), CARBITRON™ 20 (an unmodified non-hydrophobic hydroxyethylcellulose (HEC) having a molecular weight of 225,000 atomic mass units, (amu), available from Dow Chemical, Midland, Mich.), and FWCA™ (a free-water cement additive comprising an unmodified non-hydrophobic hydroxyethylcellulose (HEC) having a molecular weight of 1,000,000 atomic mass units, (amu), commercially available from Halliburton Energy Services).

In certain embodiments, the polymer or polymers used in the present invention may be present in an amount in the range of from about 20% to about 60% by weight of the additive of the present invention. In certain other embodiments, the polymer or polymers used in the present invention may be present in an amount in the range of from about 30% to about 50% by weight of the additive of the present invention. A person of ordinary skill in the art, with the benefit of this disclosure, will recognize the amount of the polymer or polymers to include in a particular application of the present invention depending on, among other factors, the other components of the cement composition or additive, the presence of a surfactant, the desired viscosity of the cement composition, the rate of fluid loss into the formation where the composition is to be used, and the like.

As used herein, the term "phosphorus component" is defined to include any phosphate ester, phosphonic acid ester, and/or phosphinic acid conforming to the structures which follow and/or derivatives thereof, and any combination or mixture thereof. Suitable phosphate esters have the formula:

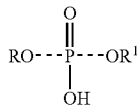

wherein R and R¹ may comprise a linear or branched hydrocarbon group having from about 1 to 30 carbon atoms that, for example, may comprise a linear or branched alkyl, alkenyl, aryl, alkylaryl, arylalkyl, cycloalkyl, alkyl ether, aryl ether, alkyl aryl ether, or a mixture thereof; and where any ether linkage has the following structure:

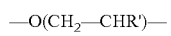

wherein R' is hydrogen, methyl or ethyl. The linear or branded alkyl, alkenyl, aryl, alkylaryl, arylalkyl, cycloalkyl, alkyl ether, aryl ether, and/or alkyl aryl ether groups used herein are not limited in size and may comprise any number of carbon atoms and/or other atoms or groups. A commercially available source of a phosphate ester that may be suitable for use in the present invention is MO-85™, available from Halliburton Energy Services.

In certain embodiments, the phosphate ester in the present invention may comprise the reaction product of a pentavalent phosphorus compound and an alcohol, and their preparation is according to well-known synthesis procedures (see, for example, U.S. Pat. Nos. 3,757,864, 4,007,128, and No. 4,200,539, all of which are incorporated herein by reference). Optionally, the phosphate esters may comprise the reaction product of 1) pentavalent phosphorus (e.g., $P_2O_5$) reacted with a trialkylphosphate, and 2) an alcohol. The synthesis of these phosphate esters takes place according to well-known procedure, for example, as set forth in U.S. Pat. No. 5,202,035 (incorporated herein by reference). Alternatively, the phosphate esters useful in the present invention can be prepared by transesterification of orthophosphate ester with triethyl phosphate, for example, U.S. Pat. No. 5,649,596 (incorporated herein by reference).

Suitable phosphonic acid esters have the formula:

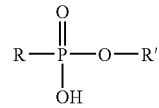

wherein R comprises a hydrocarbon group having from about 1 to about 30 carbon atoms that, for example, may comprise a linear or branched alkyl, alkenyl, aryl, alkylaryl, arylalkyl, cycloalkyl, alkyl ether, aryl ether, alkyl aryl ether, or a mixture thereof; and R' comprises a hydrocarbon group having from about 1 to about 6 carbon atoms. If R is a relatively small group, then R' may comprise a larger hydrocarbon group similar to that listed above with respect to R such as linear or branched alkyl, alkenyl, aryl, alkylaryl, arylalkyl, cycloalkyl, alkyl ether, aryl ether, alkyl aryl ether group, or a mixture thereof that may have about 1 to about 30 carbon atoms. In choosing a suitable R and R', one should be mindful that if R and R' are both relatively bulky groups (e.g., if R and R' are both 2-ethylhexyl groups), then an adequate gelled liquid hydrocarbon may not form. Techniques that can be utilized for the preparation of phosphonic acid esters useful in accordance with this invention include, for example, those described in U.S. Pat. No. 3,798,162 (incorporated herein by reference). Further descriptions of phosphonic acid esters that may be suitable for use in the phosphorus component of the present invention are discussed in U.S. Pat. App. Publication No. 2004/0214728, the relevant disclosure of which is incorporated herein by reference.

Suitable phosphinic acids have the formula:

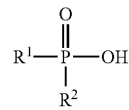

wherein R¹ may comprise a linear or branched hydrocarbon group having from about 1 to about 30 carbon atoms that, for example, may comprise a linear or branched alkyl, alkenyl, aryl, alkylaryl, arylalkyl, cycloalkyl, alkyl ether, aryl ether, alkyl aryl ether, or a mixture thereof; and R² may comprise a linear or branched hydrocarbon or aromatic group having from about 1 to about 6 carbon atoms. In choosing a suitable R¹ and R², one should be mindful that if R¹ and R² are both relatively bulky groups, then an adequate gelled liquid hydrocarbon may not form. Techniques which can be used for the preparation of an phosphinic acid useful in accordance with this invention are well known. For example, the phosphinic acid can be prepared from the reaction of alkylphosphonic dichloride with a Grignard reagent as reported by Crofts and Fox in "Unsymmetrical Dialkylphosphinic Acids" *J. Chem. Soc.* 1958, 2995-2997, the relevant disclosure of which is incorporated herein by reference. An exemplary reaction sequence is illustrated below:

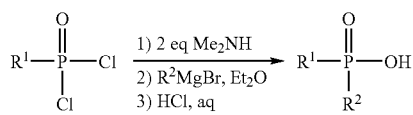

Alternatively, unsymmetrical phosphinic acids can be prepared in a one-pot synthesis using the method of Boyd et al. in "Synthesis of γ-keto-substituted phosphinic acids from bis (trimethylsilyl)phosphonite and α,β-unsaturated ketones," *Tetrahedron Lett.*, 1992, 33, 813-816 and Boyd, E. A.; Regan, A. C.; James, K. "Synthesis of Alkyl Phosphinic Acids from Silyl Phosphonites and Alkyl Halides," *Tetrahedron Lett.*, 1994, 35, 4223-4226, the relevant disclosures of which are incorporated herein by reference. Further descriptions of phosphinic acid that may be suitable for use in the phosphorus component of the present invention are discussed in U.S. Pat. App. Publication No. 2004/0214728, the relevant disclosure of which is incorporated herein by reference.

The phosphorus component used in the present invention may be present in an amount in the range of from about 0.05% to about 5% by weight of the oil-based liquid of the present invention. In certain other embodiments, the phosphorus component used in the present invention may be present in an amount in the range of from about 0.05% to about 0.2% by weight of the oil-based liquid of the present invention. A person of ordinary skill in the art, with the benefit of this disclosure, will recognize the amount of the phosphorus component or components to include in a particular application of the present invention depending on, among other factors, the other components of the cement composition or additive, the presence of a surfactant, the desired viscosity of the cement composition, the rate of fluid loss into the formation where the composition is to be used, and the like.

The term "polyvalent metal ion," as used herein, is defined to include any cation of any metallic element known in the art. Examples of such ions that may be suitable include, but are not limited to, aluminum ions, gallium ions, lanthanum ions, ruthenium ions, iron ions, or lanthamide rare earth series ions. In certain other embodiments, the polyvalent metal ions have a +3 oxidation state. Alternatively, the polyvalent metal ions may be provided in a salt of a polyvalent metal cation. A wide variety of metal salts, such as aluminum salts and rare earth metal salts, and ferric salts may be a suitable source of the trivalent metal cation. Examples of commercially-available sources of trivalent metal cations are "EA-3™" sold by Ethox Chemicals, Inc. of Greenville, S.C. and "MO-86M™", an iron III source, sold by Halliburton Energy Services of Duncan, Okla.

The polyvalent metal ion used in the present invention may be present in an amount in the range of from about 0.006% to about 0.7% by weight of the oil-based liquid of the present invention. In certain embodiments, the polyvalent metal ion used in the present invention may be present in an amount in the range of from about 0.012% to 0.07% by weight of oil-based liquid. A person of ordinary skill in the art, with the benefit of this disclosure, will recognize the amount of the trivalent metal cation or cations to include in a particular application of the present invention depending on, among other factors, the amount of the phosphorus component, the other components of the cement composition or additive, the type of surfactant present, and the like.

The oil-based liquid used in the present invention may comprise any oil-based liquid known in the art, or any combination thereof. The term "oil-based liquid," as used herein, is defined to include any non-aqueous substance that is in a liquid state that is hydrophobic and lipophilic. Examples of oil-based liquids that may be appropriate for use in accordance with the present invention include kerosene, diesel oil, crude oil, paraffinic oils and lubricating oils, and synthetic oils (including but are not limited to, synthetic hydrocarbon-base oils, ester-type oils, alkylene polymers, polysiloxanes, etc.). Examples of commercially available oil-based liquids that may be appropriate for use in accordance with the present invention ESCAID™ 90 and ESCAID™ 110 (available from Exxon), BIO-BASE™ 637 (from Shrieve Chemical Products), ENVIRO-DRILL™ (from Newpark Drilling or Wells Cargo Oilfield Services) or DISTILLATE 822™ (from Moose-Jaw Asphalt, Inc.), refined kerosene (such as LOTOX™, available from Exxon), ALPHA OLEFIN™ (available from Baker Performance Chemicals), HYDRO-SOLV™ P150 and HYDROSOLV™ B100 (from Shrieve Chemical Products), ISOPAR™ L and ISOPAR™ M (available from Nalco-Exxon Chemical Company), PETROF-REE™ (available from Halliburton Energy Services), ACCOLADE™ (available from Halliburton Energy Services), XP-07 (available from Halliburton Energy Services). Natural organic based fluids, such as animal oils and vegetable oils, also may be suitable, including but not limited to, linseed oil, palm oil, cotton seed oil, rapeseed oil, soybean oil, olive oil, canola oil, sunflower oil, peanut oil, etc. One or more organic-based solvents known as in the art as "mutual solvents" also may be suitable oil-based liquids for use in the present invention. Examples of such solvents include, but are not limited to, glycol-ethers, e.g., ethylene glycol monobutyl ether ("EGMBE"). These environmentally compatible oils and base fluids are suitable for use in conventional "green" oil drilling technologies, and feature such desirable characteristics such as high flash point and low aromatic content. The choice of the oil-based liquid for use in accordance with the present invention may depend on, among other things, the particular industrial or chemical application. Other factors, such as accessibility and cost of oil-based liquids at a particular site, may impact the choice of oil-based liquid used.

The oil-based liquid or liquids used in the present invention may be present in an amount in the range of from about 50% to about 70% by weight of the additive of the present invention. In certain other embodiments, the oil-based liquid or liquids used in the present invention may be present in an amount in the range of from about 55% to about 65% by weight of the additive of the present invention. A person of ordinary skill in the art, with the benefit of this disclosure, will recognize the amount of the oil-based liquid or liquids to include in a particular application of the present invention depending on, among other factors, the other components of the cement composition or additive, the presence of a surfactant, the desired viscosity of the cement composition, the rate of fluid loss into the formation where the composition is to be used, and the like.

Surfactants used in the present invention may, among other things, improve dispersion and/or control the release of the polymer into the cement composition. The term "surfactant," as used herein, is defined to include any substance that acts as a surface active agent, which may function as an emulsifier, a dispersant, an oil-wetter, a water-wetter, a foamer, and/or a defoamer. Surfactants suitable for use in the present invention may comprise any surfactant known in the art (or any combination thereof), and, in certain embodiments, may comprise nonionic surfactants that have low hydrophile-lipophile balance ("HLB") values for low shear environments. In certain embodiments, the low HLB values for the present invention may range from about 4 as an upper limit to any lower value that can effectively disperse and control the release of the polymer into the cement composition as one skilled in the art would recognize. A number of surfactants may be used in the various embodiments of the present invention. Examples of suitable surfactants include (without limitation) nonylphenol ethoxylates with less than 5 moles of ethylene oxide, fatty acids (e.g., oleic acid) and their salts, sorbitan trioleate, sorbitan monopalmitate, sorbitan monostearate, sorbitan distearate, sorbitan tristearate and any combination of such surfactants. Examples of commercially available surfactants that may be suitable for use in the present invention include, but are not limited to, "S-MAZ® 85-SP", "S-MAZ® 65K", and "S-MAZ® 80" available from BASF Inc.

Generally, the surfactant may be present in an amount that achieves a desired dispersing effect. In certain embodiments, the surfactant may be present in an amount in the range of from about 0.01% to about 5% by weight of the oil-based liquid. In other embodiments, the surfactants may be present in an amount in the range of from about 0.01% to about 2% by weight of the oil-based liquid. In yet other embodiments, the surfactant may be present in an amount in the range from about 0.25% to about 0.75% by weight of the oil-based liquid. One of ordinary skill in the art, with the benefits of this disclosure, will recognize the type(s) and amount(s) of surfactant(s) that should be used therein.

The cement compositions of the present invention generally comprise a cementitious component. Any cement known in the art may be suitable for use as the cementitious component in the cement composition of the present invention, including but not limited to hydraulic cements. Hydraulic cements set and harden by reaction with water, and may comprise calcium, aluminum, silicon, oxygen, sulfur, or a combination thereof. Hydraulic cements that may be suitable for use in the present invention include, but are not limited to, micronized cements, Portland cements, pozzolan cements, gypsum cements, aluminous cements, silica cements, alkaline cements, derivatives thereof, and mixtures thereof. According to certain embodiments, the cementitious material comprises at least one API Portland cement. As used herein, the term API Portland cement means any cements of the type defined and described in API Specification 10, 5th Edition, Jul. 1, 1990, of the American Petroleum Institute (the entire disclosure of which is hereby incorporated as if reproduced in its entirety), which includes Classes A, B, C, G, and H. According to certain embodiments disclosed herein, the hydraulic cement comprises Class H cement. Those of ordinary skill in the art will recognize the preferred amount of the cementitious component, depending on, among other things, the type of cementing operation to be performed.

In certain embodiments of the present invention, the cement component may comprise an aqueous fluid. The aqueous fluid in the cement compositions of the present invention may comprise any aqueous fluid that does not adversely interact with the other components used in accordance with this invention. Aqueous base fluids that may be suitable for use in certain embodiments of the cement compositions of the present invention may comprise fresh water, saltwater (e.g., water containing one or more salts dissolved therein), brine, seawater, or combinations thereof. Generally, the water may be from any source, provided that it does not contain components that might adversely affect the stability and/or performance of the treatment fluids of the present invention.

In certain embodiments, the cement compositions of the present invention may further comprise one or more set retarding agents. The term "set retarding agent," as used herein, is defined to include any substance that is used to increase the set time of cement. Suitable set retarding agents may include, but are not limited to, refined lignosulfonates. Examples of suitable set retarding agents include those that are commercially available from Halliburton Energy Services, Inc., of Duncan, Okla., under the trade names SCR-100™, HR® 6L, and HR®5. Generally, the set retarding agents should be present in the cement compositions of the present invention in an amount sufficient to provide the desired set retardation. The amount of a particular set retarding agent to include generally depends on a number of factors, including the bottom hole circulating temperature of the well, the particular set retarding agents chosen, and other factors known to those of ordinary skill in the art. In some embodiments, the quantity of the set retarding agents to be included in the cement composition may be determined prior to preparation of the cement composition. For example, the quantity of the set retarding agents to be included in the cement composition may be determined by performing thickening time tests of the type described in API Specification 10A, Twenty-Third Edition, April, 2002, the relevant disclosures of which are incorporated herein by reference.

As will be recognized by those skilled in the art, the additives and cement compositions of the present invention also may include further additional additives, including, inter alia, accelerants, gases, defoamers, microspheres, formation conditioning agents, fumed silica, bentonite, fibers, weighting materials, fluid loss control. additives, dispersants, salts, vitrified shale, fly ash, mica, sand, and the like. Still other additives suitable for use in cement compositions comprising water soluble polymer additives as described herein include but are not limited to density modifying materials (e.g., silica flour, sodium silicate, microfine sand, iron oxides and manganese oxides), dispersing agents, strength retrogression control agents and viscosifying agents. Examples of suitable dispersants include those that are commercially available from Halliburton Energy Services, Inc., of Duncan, Okla., under the trade names CFR® 2L and CFR® 3L. An example of a suitable silica compound is a silica flour commercially available from Halliburton Energy Services, Inc., of Duncan, Okla., under the trade name SSA-1. An example of a suitable fly ash is an ASTM class F fly ash that is commercially available from Halliburton Energy Services of Dallas, Tex., under the trade name POZMIX® A. One of ordinary skill in the art with the benefit of this disclosure will be able to recognize where a particular additive is suitable for a particular application.

One skilled in the art will recognize that, in certain embodiments, one or more components of the additives of the present invention may be pre-blended with each other and/or additional components of a cement composition. In other embodiments, one skilled in the art would recognize that one or more of those components may be provided separately from the other components of the additives and cement compositions of the present invention.

The additives, cement compositions, and methods of the present invention may be used in a variety of subterranean applications, including, but not limited to, primary cementing, remedial cementing, and squeeze cementing, and the like. The cement compositions and methods of the present invention also may be used to form cement plugs in a portion of a subterranean formation, which may be used, among other purposes, to isolate portions of the subterranean formation, to stabilize portions of the subterranean formation, and/or as a "kick-off" plug used to control the direction in which a well bore is drilled in a portion of a subterranean formation. The cement compositions and methods of the present invention also may be used in surface applications, for example, construction cementing.

In certain embodiments, the methods of the present invention comprise: providing a cement composition that comprises a polymer, a phosphorus component, a polyvalent metal ion, an oil-based liquid, a surfactant, an acid, and a cementitious component; introducing the cement composition into a portion of a subterranean formation (e.g., a well bore penetrating a portion of the subterranean formation); and allowing the cement composition to at least partially set therein. These methods may be used in any subterranean cementing operation, including but not limited to primary cementing, remedial cementing, drilling operations, and the like.

An example of a method of the present invention comprises providing a cement composition of the present invention; placing the cement composition in a location to be cemented; and allowing the cement composition to set therein. In some embodiments, the location to be cemented may be above ground, for example, in construction cementing. In some embodiments, the location to be cemented may be in a subterranean formation. In some embodiments, the cement compositions of the present invention may be foamed. As desired by one of ordinary skill in the art, with the benefit of this disclosure, the cement compositions of the present invention useful in this method further may comprise any of the additives listed above, as well any of a variety of other additives suitable for use in the particular application.

Another example of a method of the present invention is a method of cementing a pipe string (e.g., casing, expandable casing, liners, etc.) disposed in a well bore. An example of such a method may comprise providing a cement composition of the present invention; introducing the cement composition into the annulus between the pipe string and a wall of the well bore; and allowing the cement composition to set in the annulus to form a hardened mass. Generally, in most instances, the hardened mass should fix the pipe string in the well bore. In some embodiments, the cement compositions of the present invention may be foamed. As desired by one of ordinary skill in the art, with the benefit of this disclosure, the cement compositions of the present invention useful in this method further may comprise any of the additives listed above, as well any of a variety of other additives suitable for use in subterranean application.

Another example of a method of the present invention is method of sealing a portion of a gravel pack or a portion of a subterranean formation. An example of such a method may comprise providing a cement composition of the present invention; introducing the cement composition into the portion of the gravel pack or the portion of the subterranean formation; and allowing the cement composition to form a hardened mass in the portion. The portions of the subterranean formation may include permeable portions of the formation and fractures (natural or otherwise) in the formation and other portions of the formation that may allow the undesired flow of fluid into, or from, the well bore. The portions of the gravel pack include those portions of the gravel pack, wherein it is desired to prevent the undesired flow of fluids into, or from, the well bore. Among other things, this method may allow the sealing of the portion of the gravel pack to prevent the undesired flow of fluids without requiring the gravel pack's removal. In some embodiments, the cement compositions of the present invention may be foamed. As desired by one of ordinary skill in the art, with the benefit of this disclosure, the cement compositions of the present invention useful in this method further may comprise any of the additives listed above, as well any of a variety of other additives suitable for use in subterranean applications.

Another example of a method of the present invention is a method of sealing voids located in a pipe string (e.g., casing, expandable casings, liners, etc.) or in a cement sheath. Generally, the pipe string will be disposed in a well bore, and the cement sheath may be located in the annulus between the pipe string disposed in the well bore and a wall of the well bore. An example of such a method may comprise providing a cement composition of the present invention; introducing the cement composition into the void; and allowing the cement composition to set to form a hardened mass in the void. In some embodiments, the cement compositions of the present invention may be foamed. As desired by one of ordinary skill in the art, with the benefit of this disclosure, the cement compositions of the present invention useful in this method further may comprise any of the additives listed above, as well any of a variety of other additives suitable for use in subterranean applications.

When sealing a void in a pipe string, the methods of the present invention, in some embodiments, further may comprise locating the void in the pipe string; and isolating the void by defining a space within the pipe string in communication with the void; wherein the cement composition may be introduced into the void from the space. The void may be isolated using any suitable technique and/or apparatus, including bridge plugs, packers, and the like. The void in the pipe string may be located using any suitable technique.

When sealing a void in the cement sheath, the methods of the present invention, in some embodiments, further may comprise locating the void in the cement sheath; producing a perforation in the pipe string that intersects the void; and isolating the void by defining a space within the pipe string in communication with the void via the perforation, wherein the cement composition is introduced into the void via the perforation. The void in the pipe string may be located using any suitable technique. The perforation may be created in the pipe string using any suitable technique, for example, perforating guns. The void may be isolated using any suitable technique and/or apparatus, including bridge plugs, packers, and the like. As desired by one of ordinary skill in the art, with the benefit of this disclosure, the cement compositions of the present invention useful in this method further may comprise any of the additives listed above, as well as any of a variety of other additives suitable for use in subterranean applications.

To facilitate a better understanding of the present invention, the following examples of certain aspects of some embodiments are given. In no way should the following examples be read to limit, or define, the entire scope of the invention.

EXAMPLES

An additive of the present invention was prepared by mixing the following components:

300 g ESCAID™ oil-based liquid
1 g SPAN-85™ (surfactant)
1 g oleic acid
0.5 g MO-85M (phosphate ester)
0.5 mL MO-86M (iron III sulfate)
220 g HALAD™ 344 (water soluble polymer)

A cement composition of the present invention was prepared by mixing the additive with a cementitious component comprising the following components:

800 g Class H cement
12.1 g additive
1.6 g HR5
305 g water

The cement composition was tested in the manner described in Appendix F of API Specification 10 at 125° F. with a resultant fluid loss of 16 cc/30 minutes.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. In particular, every range of values (of the form, "from about a to about b," or, equivalently, "from approximately a to b," or, equivalently, "from approximately a-b") disclosed herein is to be understood as referring to the power set (the set of all subsets) of the respective range of values, and set forth every range encompassed within the broader range of values. Moreover, the indefinite article "a", as used in the claims, is defined herein to mean to one or more of the element that it introduces. Also, the terms in the claims have their plain, ordinary meaning unless otherwise explicitly and clearly defined by the patentee.

What is claimed is:

1. A cement composition comprising a cementitious component and an additive comprising:
    a polymer;
    a phosphorus component;
    a polyvalent metal ion;
    an oil-based liquid; and
    a surfactant.

2. The cement composition according to claim 1 wherein said polymer comprises at least one polymer selected from the group of a polysaccharide, a polyacrylate, a polyacrylamide, a hydrolyzed copolymer of acrylamide and 2-acrylamido-2-methylpropanesulfonic acid, a copolymer of N,N-dimethylacrylamide and 2-acrylamido-2-methylpropanesulfonic acid, a cellulose derivative, a hydroxyethylcellulose, a carboxymethylcellulose, a carboxymethylhydroxyethylcellulose, a galactomannan gum, a guar, a hydroxyethyl guar, a hydroxypropyl guar, a carboxymethyl guar, a carboxymethylhydroxyethyl guar, a carboxymethylhydroxypropyl guar, a derivative of guar gum, a biopolymers, a xanthan, a scleroglucan, a diutan, a derivative thereof, and a combination thereof.

3. The cement composition according to claim 1 wherein said polymer is capable of being crosslinked by a crosslinking reaction in the presence of a crosslinking agent.

4. The cement composition according to claim 1 wherein said polymer is present in an amount from 20% to about 60% by weight of the additive.

5. The cement composition according to claim 1 wherein said phosphorus component comprises at least one phosphorus component selected from the group consisting of a phosphate ester, a phosphonic acid ester, a phosphinic acid, a derivative thereof, and a combination thereof.

6. The cement composition according to claim 5 wherein the phosphate ester comprises an ester having the formula

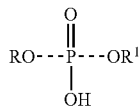

wherein R and $R^1$ comprise a linear or branched hydrocarbon group having from about 1 to 30 carbon atoms that comprise a linear or branched alkyl, alkenyl, aryl, alkylaryl, arylalkyl, cycloalkyl, alkyl ether, aryl ether, alkyl aryl ether, or a mixture thereof; and wherein an ether linkage has the following structure:

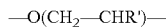

wherein R' is a hydrogen, a methyl or an ethyl.

7. The cement composition according to claim 5 wherein the phosphonic acid ester comprises a phosphonic acid ester having the formula

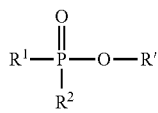

wherein R comprises a hydrocarbon group having from about 1 to about 30 carbon atoms that comprise a linear or branched alkyl, alkenyl, aryl, alkylaryl, arylalkyl, cycloalkyl, alkyl ether, aryl ether, alkyl aryl ether, or a mixture thereof; and wherein R' comprises a hydrocarbon group having from about 1 to about 6 carbon atoms.

8. The cement composition according to claim 5 wherein the phosphinic acid comprises a phosphinic acid having the formula

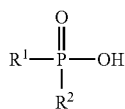

wherein $R^1$ comprises a linear or branched hydrocarbon group having from about 1 to 30 carbon atoms that comprise a linear or branched alkyl, alkenyl, aryl, alkylaryl, arylalkyl, cycloalkyl, alkyl ether, aryl ether, alkyl aryl ether, or a mixture thereof; and wherein $R^2$ comprises a linear or branched hydrocarbon or an aromatic group having from about 1 to about 6 carbon atoms.

9. The cement composition according to claim 1 wherein said phosphorus component is present in an amount from 0.05% to about 5% by weight of the oil-based liquid.

10. The cement composition according to claim 1 wherein said polyvalent metal ion comprises at least one trivalent metal cation selected from the group consisting of an aluminum ion, a gallium ion, a lanthanum ion, a ruthenium ion, an iron ion, a lanthanide rare earth series ion, a derivative thereof, and a combination thereof.

11. The cement composition according to claim 10 wherein said trivalent metal cation comprises a metal salt selected from the group consisting of an aluminum salt, a rare earth metal salt, a ferric salt, a derivative thereof, and a combination thereof.

12. The cement composition according to claim 1 wherein said polyvalent metal ion is present in an amount from 0.006% to about 0.7% by weight of the oil-based liquid.

13. The cement composition according to claim 1 wherein said oil-based liquid comprises at least one oil-based liquid selected from the group consisting of a kerosene, a diesel oil, a crude oil, a paraffinic oil, a lubricating oil, a synthetic oil, a natural organic based fluid, an organic-based solvent, a derivative thereof, and a combination thereof.

14. The cement composition according to claim 1 wherein said surfactant comprises at least one surfactant selected from the group consisting of a nonylphenol ethoxylates with less than 5 moles of ethylene oxide, a fatty acid and their salts, an oleic acid, a sorbitan trioleate, a sorbitan monopalmitate, a sorbitan monostearate, a sorbitan distearate, a sorbitan tristearate, a derivative thereof, and a combination thereof.

15. The cement composition according to claim 1 wherein said surfactant is present in an amount from 0.01% to about 5% by weight of the oil-based liquid.

16. The cement composition according to claim 1 wherein said surfactant has an HLB value of about 4 or lower.

17. The cement composition according to claim 1 wherein said cementitious component includes an aqueous fluid comprising fresh water, saltwater, brine, seawater, or combinations thereof.

18. A cement composition comprising a Class H cement and an additive comprising:
   a water-soluble polymer wherein said water-soluble polymer is present in a range of from about 30% to about 50% by weight of the additive;
   an oil-based liquid;
   a phosphate ester wherein said phosphate ester is present in a range of from about 0.05% to about 0.2% by weight of the oil-based liquid;
   an iron III ion wherein said iron III ion is present in the range of from about 0.012% to 0.07% by weight of the oil-based liquid; and
   a surfactant including an oleic acid wherein said surfactant is present in the range of about 0.01% to about 2% by weight of the oil-based liquid.

* * * * *